(12) United States Patent
Heuel et al.

(10) Patent No.: US 8,235,454 B2
(45) Date of Patent: Aug. 7, 2012

(54) VEHICLE WITH A SLIDING DOOR

(75) Inventors: Gerhard Heuel, Olpe (DE); Michael Krehmke, Plettenberg (DE); Ralf Rottmann, Drolshagen (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 0 days.

(21) Appl. No.: 12/961,001

(22) Filed: Dec. 6, 2010

(65) Prior Publication Data

US 2011/0133516 A1    Jun. 9, 2011

(30) Foreign Application Priority Data

Dec. 7, 2009   (DE) .......................... 10 2009 057 309

(51) Int. Cl.
*B60J 5/06* (2006.01)

(52) U.S. Cl. ....................................................... 296/155

(58) Field of Classification Search .................. 296/155, 296/190.11, 146.11
See application file for complete search history.

(56) References Cited

U.S. PATENT DOCUMENTS

| 5,398,988 A | 3/1995 | DeRees et al. |
| 6,206,455 B1 | 3/2001 | Faubert et al. |
| 7,950,719 B2 * | 5/2011 | Elliott et al. ................... 296/155 |
| 2007/0085374 A1 * | 4/2007 | Mather et al. ................. 296/155 |

FOREIGN PATENT DOCUMENTS

| DE | 10 2008 016 650 B3 | 5/2009 |
| EP | 2 008 846 A2 | 12/2008 |
| FR | 2 924 150 A1 | 5/2009 |

OTHER PUBLICATIONS

ISA European Patent Office, Search Report of EP 10 01 4132, Feb. 28, 2011, 5 pages.

* cited by examiner

*Primary Examiner* — Joseph Pape
(74) *Attorney, Agent, or Firm* — Alleman Hall McCoy Russell & Tuttle LLP

(57) ABSTRACT

A vehicle comprises a body, a sliding door, which comprises a guide rail and a sliding carriage which is longitudinally movably mounted on the guide rail and which is connected with the body by a multiple joint, and a centering element which is releasably connectable with a counter bearing. To improve such vehicle, a counter bearing and/or a centering element are provided in the roof region and in the floor region of the body.

12 Claims, 5 Drawing Sheets

VEHICLE WITH A SLIDING DOOR

CROSS REFERENCE TO RELATED APPLICATION

This application claims priority to German Patent Application No. 10 2009 057 309.7, entitled "Vehicle with a Sliding Door", filed Dec. 7, 2009, which is hereby incorporated by reference in its entirety for all purposes.

TECHNICAL FIELD

The present disclosure relates to a vehicle, in particular a motor vehicle, with a body, a sliding door and a centering element which is releasably connectable with a counter bearing.

The sliding door comprises a guide rail and a sliding carriage which is longitudinally movably mounted on the guide rail and which is connected with the body by a multiple joint. The centering element is provided at the end of the sliding door facing away from the multiple joint. The centering element can be provided at the sliding door. In this case, the centering element is releasably connectable with a counter bearing provided at the body. It is, however, also possible that the centering element is provided at the body. In this case, the centering element is releasably connectable with a counter bearing provided at the sliding door.

BACKGROUND AND SUMMARY

A sliding door of the type mentioned above is known from DE 10 2008 016 650 B3, to which reference is made here expressly. In this sliding door, the multiple joint comprises a hinge stirrup which is rotatably mounted on the sliding carriage and on a body flange, and a control lever which is rotatably mounted on the sliding carriage and on a or the body flange. The prior art sliding door furthermore comprises a first intermediate lever which is rotatably mounted on the control lever, and a second intermediate lever which is rotatably mounted on the first intermediate lever and on the sliding carriage. At the end facing away from the multiple joint, the sliding door is rotatably and longitudinally movably mounted by a centering element. It can be locked there. The control lever includes an extension on which the first intermediate lever is rotatably mounted. At the connecting joint of the first intermediate lever and of the second intermediate lever a guide pin is provided, which is guided in a guideway provided at the sliding door. The guideway extends inclined relative to the guide rail. The guideway extends inclined outwards in a direction away from the hinge stirrup.

Another sliding door as mentioned above is described in EP 2 008 846 A2, to which reference likewise is made here expressly. Here, a drive rod is present, which is rotatably mounted on the control lever. At the end facing away from the multiple joint, the sliding door is rotatably and longitudinally movably mounted by a centering element. It can be locked there. The drive rod is rotatably mounted on the guide rail. The control lever includes a lever arm on which the drive rod is rotatably mounted. At the intermediate lever a guide pin is provided, which is guided in a guideway provided at the sliding door.

It is the object of the present disclosure to propose an improved sliding door of the type mentioned above.

In accordance with the present disclosure, this object is solved by a vehicle with a body, with a sliding door which comprises a guide rail and a sliding carriage which is longitudinally movably mounted on the guide rail and which is connected with the body by a multiple joint, and with a centering element which is releasably connectable with a counter bearing. This solution is characterized in that a counter bearing and/or a centering element are provided in the roof region and in the sill region of the body. This can improve the stability of the vehicle in the closed position of the sliding door.

Advantageously, the body does not include a pillar at the part of the sliding door facing away from the multiple joint. When the sliding door is used for example as rear door of a motor vehicle, when the multiple joint is provided in the region of the C-pillar and when the sliding door can be opened towards the rear, it may be advantageous when no B-pillar is present in the body.

In the closed position, the sliding door then is retained in the roof region and in the sill region by the counter bearings and centering element. Since the pillar of the body is missing at the end of the sliding door facing away from the multiple joint, i.e. since in particular the B-pillar is missing, the access opening to the vehicle can substantially be increased. In particular, wheelchairs or the like can more easily or at all be moved into the vehicle or be removed from the vehicle. Nevertheless it is possible to use a sliding door of the type mentioned above.

Both in the roof region and in the sill region a counter bearing and a centering element each are present. It is possible that both counter bearings are provided at the body and both centering elements are provided at the sliding door. It is, however, also possible to provide both counter bearings at the sliding door and both centering elements at the body. Finally, it is also possible to provide one of the two counter bearings at the body and the other counter bearing at the sliding door. The centering elements then each are disposed at the other part.

In certain cases it is advantageous when one counter bearing is provided in the roof region of the body and one counter bearing is provided in the sill region of the body.

In accordance with another advantageous development, one or both counter bearings include a guideway for the centering element. The centering element is guided in the respective guideway. The guideway can be formed as guide channel.

Another advantageous development is characterized in that the one or more centering elements include a centering pin. The centering pin can have a circular cross-section.

Advantageously, the movement curve of the counter bearing differs from the movement curve of the centering element. In this way, a bracing of the sliding door can be produced.

Another advantageous development is characterized in that the end point of the movement curve of the counter bearing corresponds with the end point of the movement curve of the centering element. Then, no bracing of the sliding door is produced at the end point of the movement curves. Due to the deviation of the movement curves existing in the surroundings of the end point, a bracing of the sliding door is produced on leaving the end point, which retains the sliding door at the end point. This bracing generates a resistance to opening of the sliding door. In this way, a stable position of the sliding door can be achieved at its end point.

An embodiment of the present disclosure will be explained in detail below with reference to the attached drawing.

DETAILED DESCRIPTION

Figure 1:
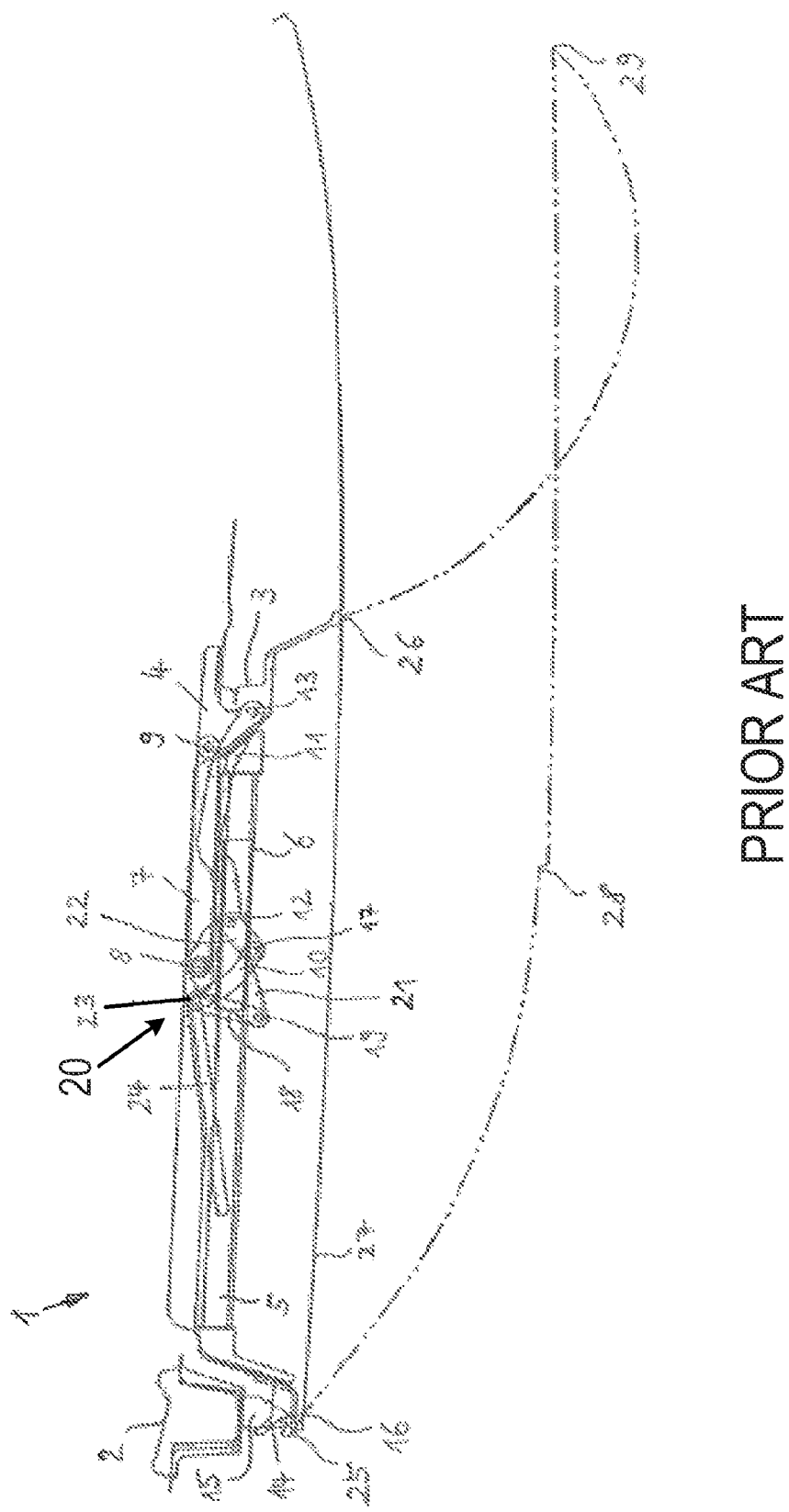
FIG. 1 shows a prior art sliding door for a motor vehicle in the closed position in a schematic view from above.
Figure 2:
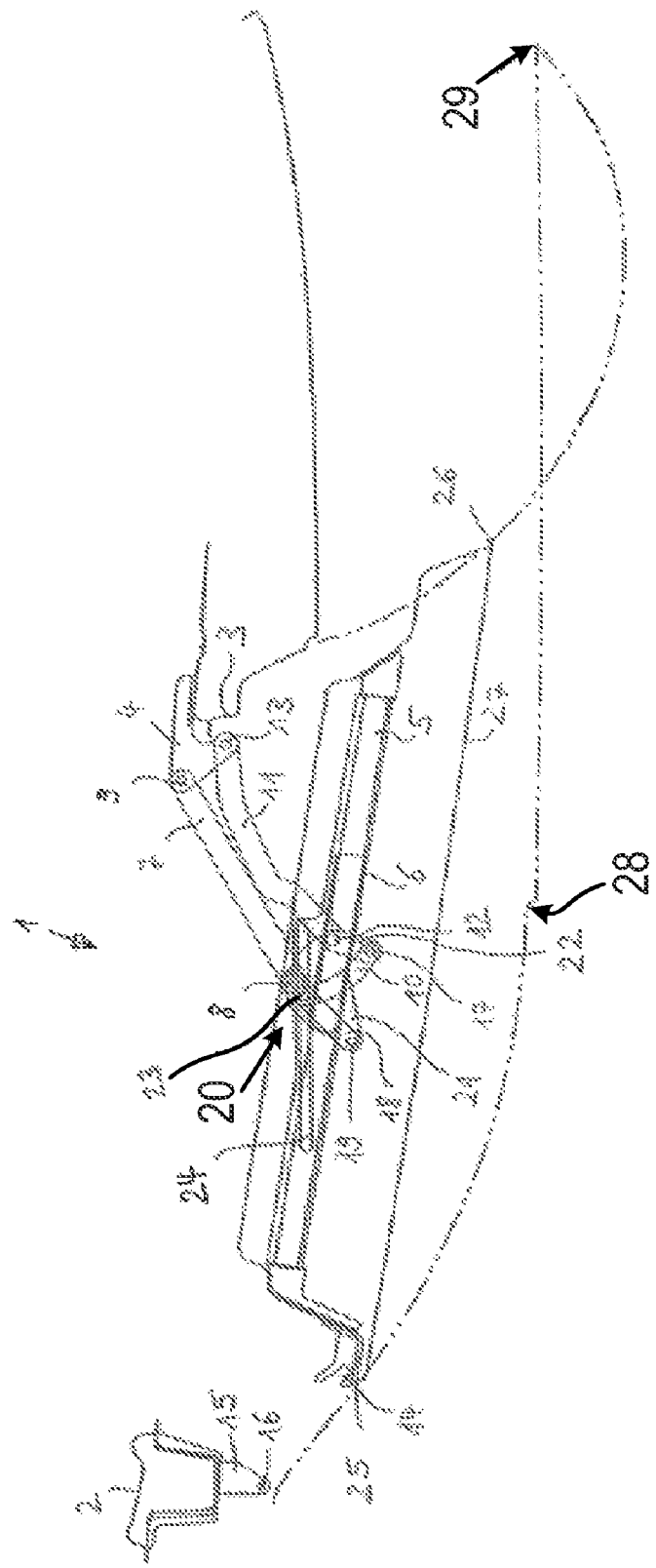
FIG. 2 shows the sliding door of FIG. 1 in a partly open position in a schematic view from above corresponding to FIG. 1.
Figure 3:
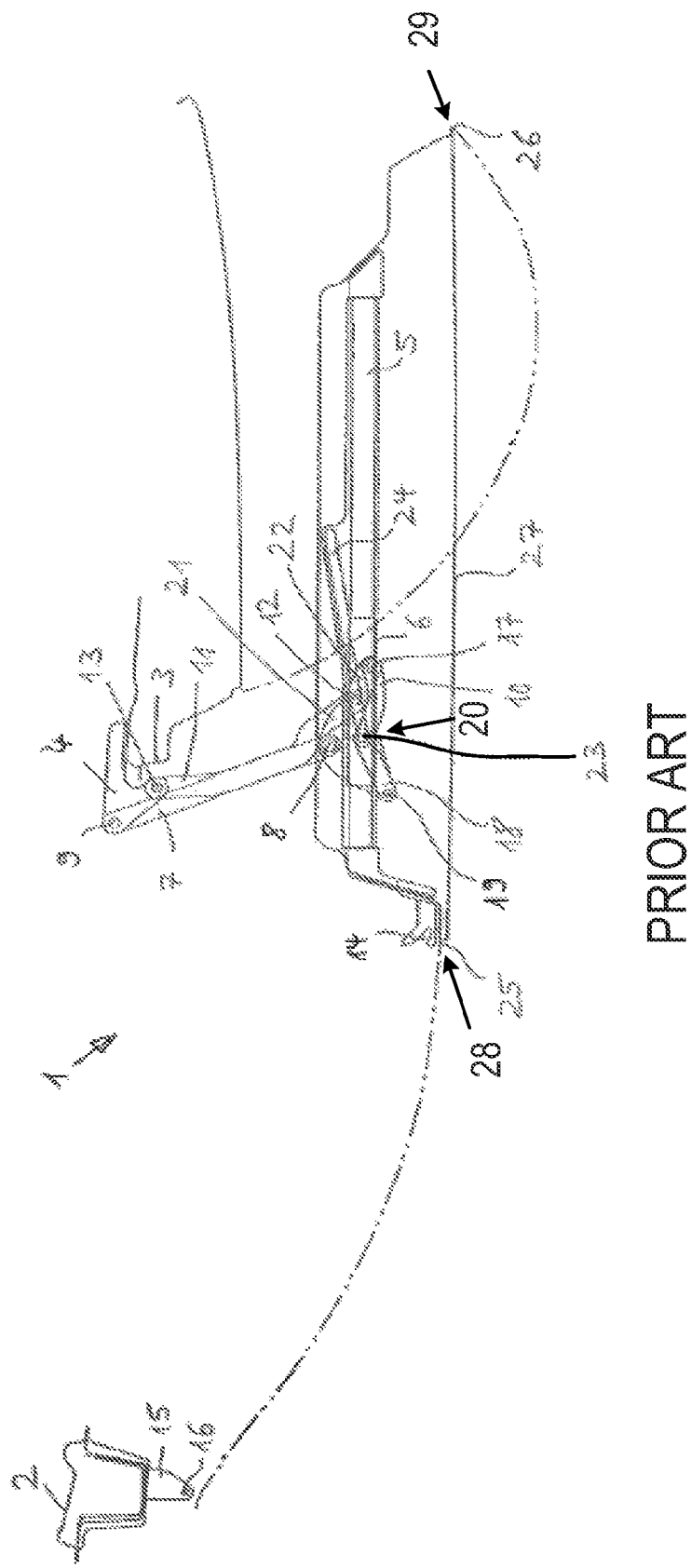
FIG. 3 shows the sliding door of FIGS. 1 and 2 in the completely open position in a schematic view from above corresponding to FIGS. 1 and 2.

FIGS. 1, 2 and 3 show the sliding door 1 according to an embodiment of DE 10 2008 016 650 B3. The sliding door 1 is the left rear door of a motor vehicle. It is located in the opening of the body between the B-pillar 2 and a rear body part 3 in whose region a body flange 4 is connected with the body. The rear body part 3 can be the C-pillar or the A-pillar.

On its inside, the sliding door 1 includes a guide rail 5. On the guide rail 5, a sliding carriage 6 is mounted in a longitudinally movable manner.

The sliding door 1 furthermore includes a hinge stirrup 7 and a control lever 11. The hinge stirrup 7 is rotatably mounted on the sliding carriage 6 about a joint 8 and on the body flange 4 about a joint 9. The control lever 11 is rotatably mounted on the sliding carriage 6 about a joint 12 and on the body flange 4 about a joint 13.

On the control lever 11 a first intermediate lever 10 is rotatably mounted, namely about the axis of a joint 17. On the sliding carriage 6 a second intermediate lever 18 is rotatably mounted, namely about the axis of a joint 19. The joint 19 is located in the outer region of the sliding carriage 6. It is located in the region of the front end of the sliding carriage 6. The ends of the intermediate levers 10, 18 facing away from the joints 17, 19 are rotatably connected with each other by a joint 20. The first intermediate lever 10 and the second intermediate lever 18 form a toggle lever. Since the connecting joint 20 of the intermediate levers 10, 18 is located further to the inside than the joints 17, 19 with respect to the motor vehicle, the toggle lever formed by the intermediate levers 10, 18 points to the inside with respect to the motor vehicle.

To the sliding carriage 6 a joint plate 21 is attached, which carries the joints 8, 12 and 19. The hinge stirrup 7, the control lever 11, the sliding carriage 6 as well as the joint plate 21 and the body flange 4 form a multiple joint with the joints 8, 9, 12 and 13.

At the end of the sliding door 1 opposite the hinge stirrup 7 a U-shaped receptacle 14 is provided at the sliding door 1, which extends inclined with respect to the longitudinal direction of the vehicle, namely in vehicle direction forwards to the inside. It is open at its end facing away from the hinge stirrup 7, i.e. at its front inner end in this embodiment. On a body flange 15, which is attached to the B-pillar 2, a hinge bolt 16 is provided, which engages in the U-shaped receptacle 14. In the completely closed position of the sliding door as shown in FIG. 1, the hinge bolt 16 is located at the bottom of the U-shaped receptacle 14. It can be locked there (not shown in the drawing).

The control lever 11 includes an extension 22 which extends outwards from the joint 12. The extension 22 extends the control lever 11 along the connecting line from the joint 13 to the joint 12 beyond the joint 12. The extension 22 is slightly bent to the outside and to the rear, respectively, with respect to the connecting line between the joints 13 and 12, i.e. the longitudinal direction of the control lever 11. At the control lever 11, the joint 17 for the first intermediate lever 10 is provided in the region of the outer end of the extension 22.

At the connecting joint 20 of the first intermediate lever 10 and of the second intermediate lever 18, a guide pin 23 is provided, which is guided in a guideway 24. The guideway 24 is provided at the sliding door 1. Correspondingly, the guideway 24 is a guideway firmly mounted in the door. It extends with an inclination relative to the guide rail 5 in a direction away from the hinge stirrup 7 to the outside. The guideway 24 is configured continuously linearly. Its inclination is the same along its entire length.

In the completely closed position of the sliding door 1, which is shown in FIG. 1, the hinge bolt 16 lies in the U-shaped receptacle 14, namely in the region of its end. The guide pin 23 is located in the region of the rear, inner end of the guideway 24. The first intermediate lever 10 points forwards and to the inside from the joint 17. The second intermediate lever 18 points rearwards and to the inside from the joint 19.

In the course of the opening movement, the position as shown in FIG. 2 is passed through. This opening movement can be generated in that the guide rail 5 is moved to the rear relative to the sliding carriage 6. On the sliding carriage 6 a motor, in particular an electric motor, can be provided for driving the guide rail 5 relative to the sliding carriage 6. Instead or in addition a motor, in particular an electric motor, can be provided for driving the hinge stirrup 7 and/or the control lever 11. Advantageously, a motor for driving the hinge stirrup 7 and/or the control lever 11 is provided on the body flange 4 or some other body part.

The opening movement can, however, also be generated by hand instead or in addition. In particular, the guide rail 5 can manually be moved to the rear relative to the sliding carriage 6. For this purpose, a handle or several handles can be provided at the sliding door 1, by means of which the sliding door 1 and with the same the guide rail 5 can be moved relative to the sliding carriage 6. The handle can be provided at the inner front end of the sliding door 1 and/or at the outer front end of the sliding door 1 and/or at the outer rear end of the sliding door 1. The sliding door 1 can be opened and also be closed again by applying force at each of these three points.

Without the guide pin 23, the sliding carriage 6 might freely be shifted on the guide rail 5. The guide pin 23 guided in the guideway 24 prevents this free shiftability and defines the relative position of the sliding carriage 6 with respect to the guide rail 5 and hence with respect to the sliding door 1. This is effected in the portions of the guideway 24 which have an inclination different from zero with respect to the guide rail 5, i.e. do not extend parallel to the guide rail 5. The guideway 24 has the same inclination different from zero with respect to the guide rail 5 along its entire length.

When the guide rail 5 is moved to the rear relative to the sliding carriage 6 by motor and/or by hand, the guide pin 23 guided in the guideway 24 moves to the outside relative to the guide rail 5 and to the sliding carriage 6, whereby the second intermediate lever 18 is swiveled in clockwise direction about the joint 19. By moving the guide pin 23 relative to the sliding carriage 6 to the rear and to the outside, the joint 17 located at the other end of the first intermediate lever 10 likewise is moved to the rear, whereby the control lever 11 is rotated about the joint 12 in anti-clockwise direction. The control lever 11 thereby is swiveled in anti-clockwise direction about the joint 13 at the body flange 4. By swiveling the control lever 11, the hinge stirrup 7 is also swiveled in anti-clockwise direction about the joint 9. The joint plate 21 of the sliding carriage 6 likewise is forcibly guided by swiveling the hinge stirrup 7 about the joint 9, since it forms a multiple joint with the hinge stirrup 7, the control lever 11 and the body flange 4—as explained above.

The drive movement for opening the sliding door 1 can, however, also be initiated in some other way, in particular by a motorized and/or manual drive of the hinge stirrup 7 and/or the control lever 11 and/or the first intermediate lever 10 and/or the second intermediate lever 18 about one or more of the joints 9, 8, 13, 12, 17, 20, 19.

The completely open position of the sliding door 1 is shown in FIG. 3. The first intermediate lever 10 has been swiveled in clockwise direction about the joint 17 with respect to the extension 22 by about 90°. The guide pin 23 has reached the front, closed end of the guideway 24. The second intermediate lever 18 has been swiveled in clockwise direction about the joint 19 with respect to the sliding carriage 6 or the joint plate 21 by about 45°. The opening angle of the intermediate levers 10, 18 at the joint 20 has been increased from about 30° to about 150°. The control lever 11 and the hinge stirrup 7 have been swiveled by an angle of 120° in anti-clockwise direction about the joints 13 and 9.

When the sliding door 1 is to be closed, the described positions are passed through in reverse order. The closing movement of the sliding door 1 can be effected in that the guide rail 5 is moved forwards by motor and/or by hand relative to the sliding carriage 6. The relative movement of the guide rail 5 is transmitted by the guideway 24 to the guide pin 23 and from there introduced into the described multiple joint via the first intermediate lever 10. It is also possible, however, to initiate the closing movement in a way as it has been described for the opening movement.

In FIGS. 1, 2 and 3, the paths of the front end 25 and of the rear end 26 of the outer door panel 27 are illustrated. The front end 25 of the outer door panel 27 initially moves at an angle of about 30° with respect to the longitudinal axis of the vehicle to the rear and to the outside. The angle of inclination of the U-shaped receptacle 14 corresponds to this angle. Subsequently, it describes an arc with a large radius, whose end 28 includes a tangent extending parallel to the longitudinal axis of the vehicle. The rear end 26 of the outer door panel 27 initially moves approximately at right angles away from the body and then describes a narrowing arc up to an end point 29 which substantially has the same distance from the body of the vehicle as the end point 28 of the front end 25.

Figure 4:
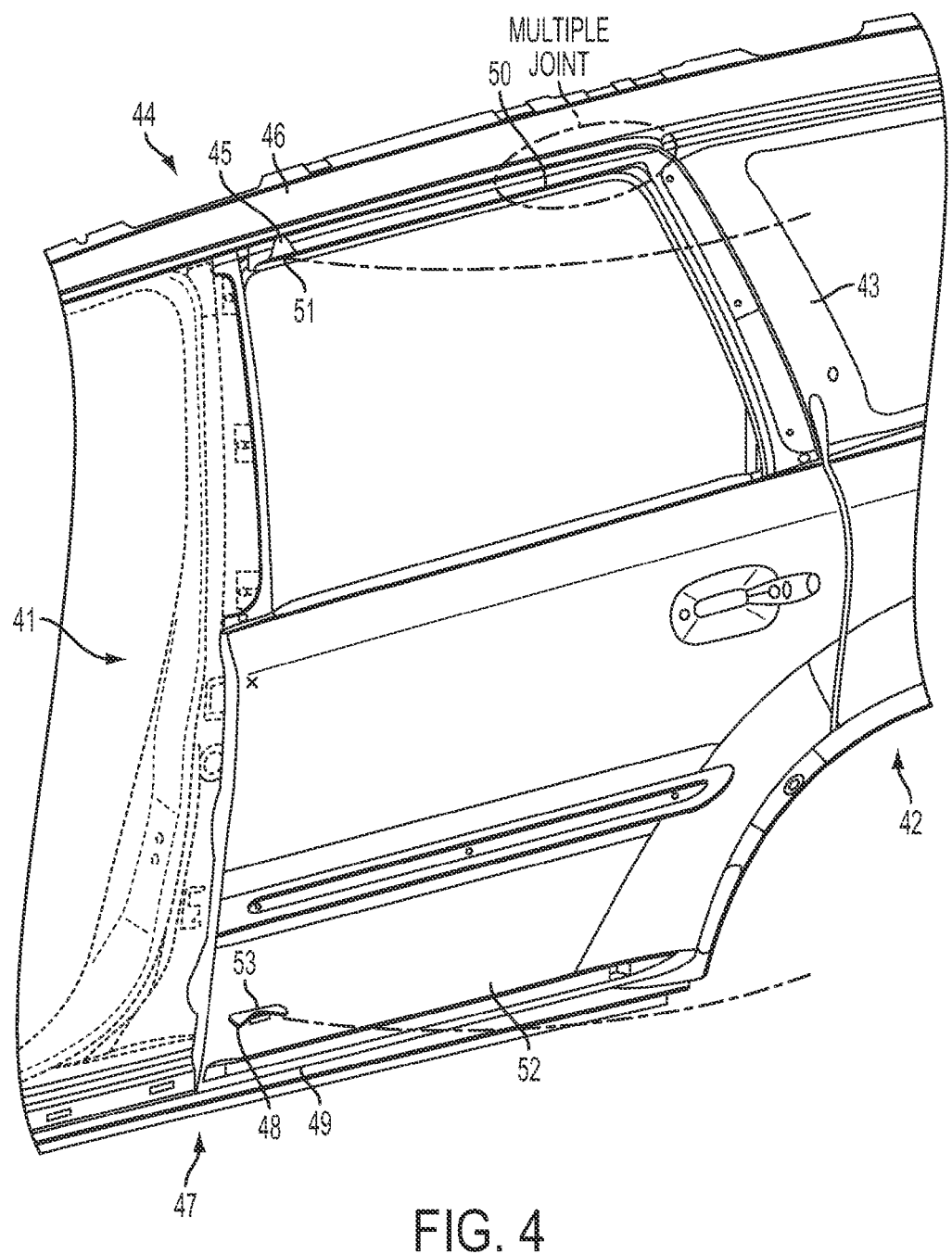
FIG. 4 shows a part of a body and a sliding door in a perspective view.

FIG. 4 shows a sliding door 41 and associated parts of the body 42 in a perspective representation, which are formed other than in the embodiment of FIGS. 1 to 3. A multiple joint, such as the multiple joint shown in FIGS. 1-3 which is formed by elements 7, 11, 6, and 4, is provided at the rear end of the sliding door 41. While the multiple joint is not visible in this perspective view, the multiple joint contributes to the sliding door mechanism. The multiple joint is connected with the C-pillar 43 of the body 42. At the end of the sliding door 41 facing away from the multiple joint, a counter bearing 45 is provided in the roof region 44. The counter bearing 45 is mounted at a roof drip molding 46. It is located in the lower region of the roof drip molding 46.

In the sill region 47 a further counter bearing 48 is provided. The counter bearing 48 is arranged at a floor sill 49. It is located in the upper region of the floor sill 49.

At its upper end strip 50 the sliding door 41 includes a centering element 51 which cooperates with the counter bearing 45. At its floor panel 52 the sliding door 41 includes a centering element 53 which cooperates with the counter bearing 48. The centering elements 51, 53 are located at the front end of the sliding door 41, i.e. at the end of the sliding door 41 facing away from the multiple joint. As introduced above, the body 42 does not include a B-pillar.

Figure 5:
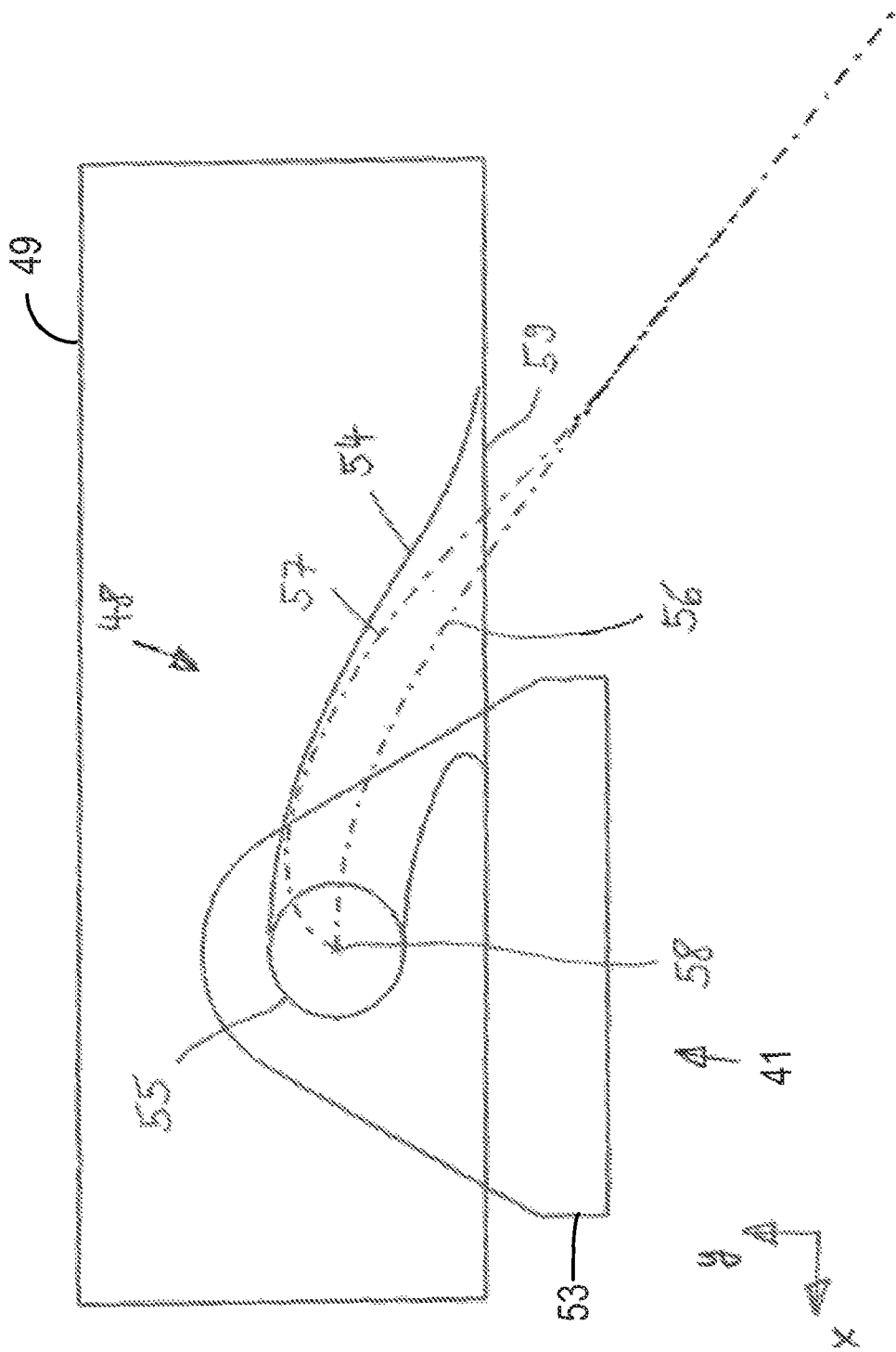
FIG. 5 shows a counter bearing and a centering element of the motor vehicle of FIG. 4 in a schematic view from above. The figures are drawn approximately to scale.

FIG. 5 shows the counter bearing 48 and the centering element 53 of FIG. 4 in an enlarged schematic representation from above. The counter bearing 45 and the centering element 51 are formed in the same way as counter bearing 48 and centering element 53, respectively.

The counter bearing 48, which is provided at the floor sill 49 of the body 42, comprises a guideway 54 which is formed as guide channel. The centering element 53, which is provided at the sliding door 41, includes a centering pin 55. The centering pin 55 has a circular cross-section. The width of the guideway 54 substantially corresponds to the diameter of the centering pin 55.

FIG. 5 shows the end position of the centering pin 55 in the guideway 54, which is taken by the centering pin 55 with completely closed sliding door 41. The centering pin 55 then is located at the front end of the guideway 54.

In FIG. 5, the movement curve of the centering pin 55 is provided with the reference numeral 56. It follows the center line of the guideway 54.

In FIG. 5, another movement curve of the centering pin 55 is provided with the reference numeral 57. This movement curve is determined by the mechanics of the door, i.e. by the position and dimensions of the multiple joint, the guide rail, the sliding carriage and the centering pin 55, if the centering pin 55 were not bound to the guideway 54. In this scenario, the centering pin 55 would pass through the movement curve 57 with the movement of the sliding door 41. As shown in FIG. 5, the movement curve 56 of the centering pin 55 differs from the movement curve 57.

Due to the guideway 54, the centering pin 55 is forced into the movement curve 56. As such, the centering pin is forcibly guided in the movement curve 56. This results in a bracing which leads to a corresponding deformation of the sliding door 41.

As is likewise shown in FIG. 5, the end point 58 of the movement curve 56 of the centering pin 55 corresponds with an end point of the guideway 54. Therefore, the end point 58 corresponds to the position of the centering pin 55 in the completely closed position of the sliding door 41. In this completely closed position, the sliding door 41 hence is not braced and not deformed.

When the sliding door is to be opened from its completely closed position, the centering pin 55 is moved to the rear in the guideway 54 (i.e., movement curve 56). Since the movement curve 57 differs from the movement curve 56, a bracing and hence deformation of the sliding door 41 is generated by this movement. The expenditure of energy required for this purpose stably retains the sliding door 41 in its completely closed position. It must be overcome on opening of the sliding door 41.

On opening of the sliding door 41, the centering pin 55 passes through the guideway 54 to the rear, until it exits from the guideway 54 through the opening 59 of the guideway 54. The opening 59 of the guideway 54 has a funnel-shaped design. On closing of the sliding door, the reverse way is passed through. Due to the funnel-shaped design of the opening 59 it is ensured that the centering pin 55 can reliably be introduced into the guideway 54 on closing of the sliding door 41.

The invention claimed is:
1. A vehicle, comprising:
a body;

a sliding door which comprises a guide rail and a sliding carriage which is longitudinally movably mounted on the guide rail and which is connected with the body by a multiple joint; and a centering element which is releasably connectable with a counter bearing, the centering element releasing from the counter bearing to open the sliding door;

wherein either the counter bearing or the centering element is provided in a roof region or a sill region of the body.

2. The vehicle according to claim 1, wherein the body does not include a pillar at an end of the sliding door facing away from the multiple joint.

3. The vehicle according to claim 1, wherein the counter bearing is a first counter bearing provided in the roof region of the body, the vehicle further comprising a second, different, counter bearing provided in the sill region of the body.

4. The vehicle according to claim 1, wherein the counter bearing includes a guideway for the centering element.

5. The vehicle according to claim 4, wherein the centering element includes a centering pin.

6. The vehicle according to claim 5, wherein a movement curve of the centering pin follows a center line of the guideway.

7. A vehicle, comprising:

a body including a C-pillar, a roof region, and a sill region;

a sliding door which comprises a guide rail and a sliding carriage which is longitudinally movably mounted on the guide rail and which is connected with the body by a multiple joint, the sliding door openable towards a rear of the vehicle;

a plurality of centering elements, each of which are releasably connectable with a corresponding counter bearing, each centering element releasing from the counter bearing to open the sliding door; and a first counter bearing, a first centering element, a second counter bearing, and a second centering element;

wherein either the first counter bearing or the first centering element is provided in a roof region of the body, wherein either the second counter bearing or the second centering element is provided in a sill region of the body, wherein the body does not include a pillar at the part of the sliding door facing away from the multiple joint, and wherein the multiple joint is positioned in a region of the C-pillar.

8. The vehicle of claim 7 wherein, in a closed door position, the sliding door is retained in the roof region and in the sill region by the counter bearing and the centering element.

9. The vehicle according to claim 8, wherein the counter bearing is a first counter bearing provided in the roof region of the body, the vehicle further comprising a second, different, counter bearing provided in the sill region of the body.

10. The vehicle according to claim 9, wherein the counter bearing includes a guideway for the centering element.

11. The vehicle according to claim 10, wherein the centering element includes a centering pin.

12. The vehicle according to claim 11, wherein a movement curve of the centering pin follows a center line of the guideway.

\* \* \* \* \*